Figure 3:
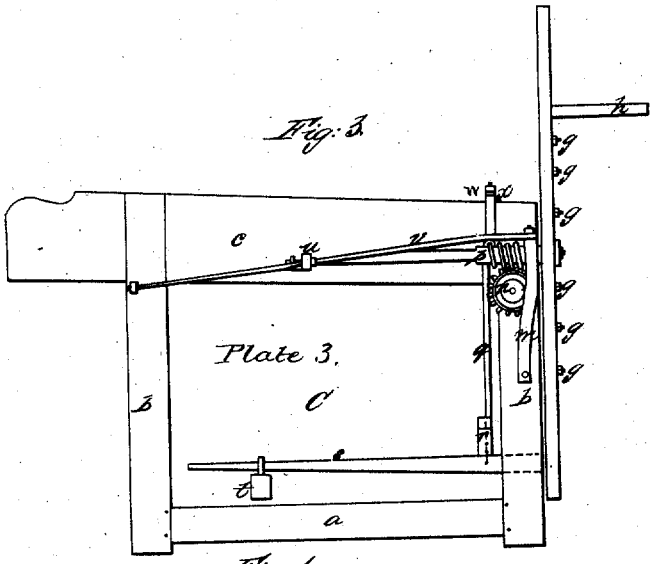
Figure 1:
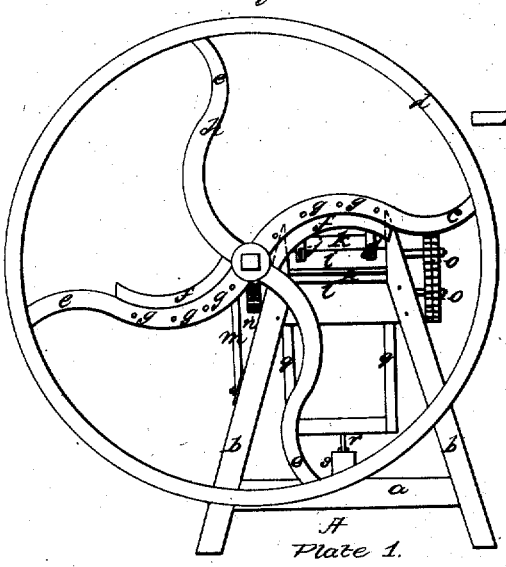
Figure 2:
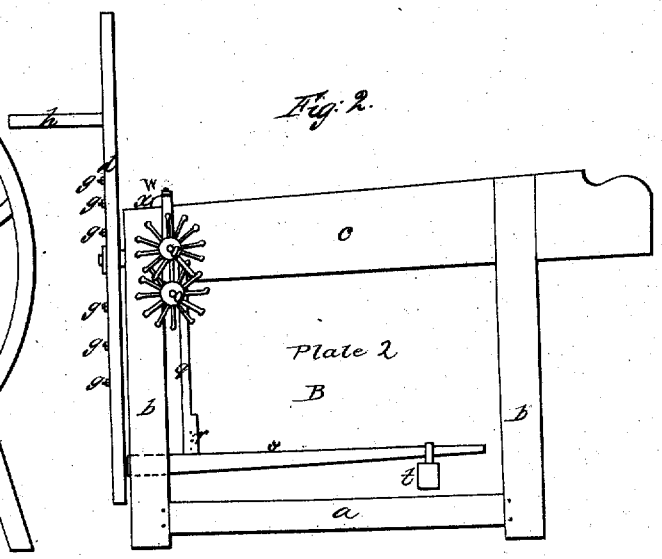

9374X

No Printed Specification Available

J. Everett.

Straw Cutter.

Patented Feb. 10, 1836.

Feb 10. 1836 9374X 229.

Joseph Evered, an Alien resident two years U.S.

dated Feb. 10. 1836—

Letters Patent, Received & Recorded again

The schedule referred to in these Letters Patent and making part of the same, containing a description in the words of the said Joseph Evered himself of his improvement in the Machine for cutting straw and other substances.

To all to whom these presents shall come: Be it known that I, Joseph Evered, an alien resident two years & upwards in the United States, of Geneva in the County of Ontario and State of New York, have invented a new and useful improvement in a vertical straw cutting Machine and that the following is a full and exact description of the construction and operation of the said Machine as invented or improved by me: The Machine has a vertical revolving motion and may be propelled by manual, horse, water or other power and with the ease by which it may be used and put into operation, has a decided advantage over any other straw cutter known to the said Evered. The plates hereto annexed 1. 2. 3. and the lettering of the same together with the specification of the Machine given below, will particularly set forth and describe the different parts of the Machine, the distinct operation of each part and the effect produced by combining the whole when put to use to wit: Plate No 1. letter A. represents an upright end view of the frame fly wheel, knives, finger wheels worm wheel and press when the Machine is in the operation of cutting. Plate No 2 letter B— represents an upright right side view of the frame, fly wheel, finger wheels and press— Plate No 3. letter C. represents an upright left side view of the frame, fly wheel worm wheel, worm spindle and press.— Plate No 4.

letter

9374X letter A. b b. represents the legs of the frame. a the cross
ledge connecting and supporting the two legs b.b. – c re=
presents the face of the machine into and supporting
the legs b b. at top. d the rim of the fly wheel e e e e the arms
of the fly wheel of the semi recte form g.g.g.g.g.g. the bolts
connecting the knives to the arms of the fly wheel as
will more plainly appear in plates No 2 & 3. f f repre=
sent the knives of concave edges bolted on to the
arms of the fly wheel e e which may be increased
to six knives or reduced to one knive. h. represents
the handle attached to the fly wheel for the purpose
of propelling the machine by manual power as will
plainly appear by plates No. 2 & 3. k. k. represent two
fluted rollers for the purpose of drawing the straw
forward on the Journals of which are attached finger
wheels o. o. as will more plainly appear in plate No
3. o. o. which are propelled by worm wheel 7 7. as will
plainly appear in plate No 3. l l represent the top part of
the press which presses the straw after it leaves the
rollers. the unshaded part letter K represents the space
where the straw passes through to be cut by the knives.
q q. represent the lower part of the press frame in
supporting at the top roller K, which rises and falls
to receive and press the straw of any thickness within
the description of the finger wheels. by means of lever
s and weight t as will plainly appear in plates No 3 & 3.
v represents the mode of connecting the lower part of the press
frame with the lever S. m. represents the boxes of the coup-
ling of the worm spindle to the fly wheel d. Plate No 2 letter
B. b b. represent the legs of the right side of the frame. a.
represents the right side ledge connecting and supporting
the legs of the frame. c represents the right side of the box
in which the straw is placed similar to the box of
the

9374X the common straw cutter. d represents the upright edge
of the fly wheel. g.g.g.g.g.g. represent the bolts fastening the
knives to the arms e.e. as described in plate No. 1. h re=
presents the handle by which the fly wheel is propelled
by manual power. o.o. represent the double finger wheels
which may rise and fall, from the center, from one
inch to a foot if required and still mash perfectly in
smooth [illegible] Journals of which are placed the rollers in
b.b. as described in plate No. 1 which rollers will rise
and fall to admit straw or any other fodder of any
thickness within the description of the finger wheels,
the top roller being pressed by the levers, and weight 9.
attached by the lower part of the press frame 9 & Y. w re=
presents the screw nut to support the brace x. Plate
No. 3. letter C. represents an upright left view of the
machine. — b.b. a b. g.g.g.g.g.g. d. k. s. t. q. r. represent the same as
described in plate No. 1. 2. 2. represents the worm and spindle
mashing into the cogs of worm wheel b.b. on which is
placed the fly wheel d which puts the rollers, knives and
all in motion. u represents the center screw to the spindle
P by which the knives may be drawn close to and regulated
with the face of the machine. V. represents a brace support
ing the coupling of the spindle P and the center screw
U. — W. the screw nut to support the brace X. — on the coupling
for the journal of spindle P. —

The petitioner claims an exclusive right to the invention
of the finger wheels; the rising and falling of the rollers, the compres
sion produced by the levers S. & weight T, the concavity of the knives edges
the plan of the face of the machine through which the straw is
drawn; the center screw on the worm and spindle and its use.

Witnesses

Samuel O. Codington
Nathan Parke

Joseph Conrad (1822 [illegible])

[illegible]

Exd [illegible]